United States Patent [19]

Ference

[11] 4,092,139

[45] May 30, 1978

[54] PROCESS FOR MAKING COLORED PHOTOSENSITIVE GLASS

[75] Inventor: Joseph Ference, Corning, N.Y.

[73] Assignee: Corning Glass Works, Corning, N.Y.

[21] Appl. No.: 778,160

[22] Filed: Mar. 16, 1977

[51] Int. Cl.² .................. C03C 15/00; C03B 32/00; C03C 3/04
[52] U.S. Cl. ................................ 65/30 R; 65/33; 65/DIG. 2; 106/52; 106/DIG. 6
[58] Field of Search ............ 106/DIG. 6, 52; 65/DIG. 2, 33, 30 R

[56] References Cited

U.S. PATENT DOCUMENTS

| | | | |
|---|---|---|---|
| 3,833,511 | 9/1974 | Yamashita et al. | 106/DIG. 6 |
| 3,876,436 | 4/1975 | Lythgoe | 106/52 X |
| 3,892,582 | 7/1975 | Simms | 106/52 |
| 3,920,463 | 11/1975 | Simms | 106/DIG. 6 |
| 4,017,318 | 4/1977 | Pierson et al. | 106/52 |
| 4,057,408 | 11/1977 | Pierson et al. | 65/DIG. 2 |

*Primary Examiner*—Richard V. Fisher
*Assistant Examiner*—Frank W. Miga
*Attorney, Agent, or Firm*—Clinton S. Janes, Jr.; Clarence R. Patty, Jr.

[57] ABSTRACT

An improvement upon the making of colored photosensitive glasses via the exposure thereof to high energy or actinic radiation followed by heat treatment thereof, the improvement comprising conducting the exposure of the glasses while such are at a temperature between about 200° – 410° C. to thereby considerably shorten the time required for developing color and to produce colors of very high intensity.

14 Claims, No Drawings

PROCESS FOR MAKING COLORED PHOTOSENSITIVE GLASS

BACKGROUND OF THE INVENTION

U.S. application Ser. No. 646,259, filed Jan. 2, 1976 by J. E. Pierson and S. D. Stookey, now U.S. Pat. No. 4,017,318, describes the making of photosensitive colored glasses or polychromatic glasses, as they have been variously called. Two fundamental methods for preparing such glasses are disclosed therein, each method involving a sequence of irradiation and heat treating steps. The glasses can be composed of a wide range of base compositions but each must contain silver, an alkali metal oxide which is preferably $Na_2O$, fluoride, and at least one halide selected from the group of chloride, bromide, and iodide. The glasses are irradiated with high energy or actinic radiations selected from the group of high velocity electrons, X-radiations, and ultra-violet radiations in the range of about 2800A–3500A. The heat treatments involve exposures to temperatures between about the transformation range of the glass up to about the softening point thereof. Where the actinic radiation is supplied as ultra-violet radiation, $CeO_2$ is a required component of the glass composition.

In one of the methods described therein, the glass is initially exposed to high energy or actinic radiations. This exposure develops a latent image in the glass. The intensity and time of this exposure determine the final color which will be produced in the glass. Thereafter, the glass is subjected to a heat treatment which causes the precipitation of colloidal silver particles in situ to act as nuclei. Where a transparent final product is desired, the heat treatment will be undertaken only for so long as to effect the precipitation of colloidal silver nuclei and to cause the growth thereon of extremely small microcrystals of alkali metal fluoride-silver halide, e.g., $NaF$ + ($AgCl$ and/or $AgBr$ and/or $AgI$). If an opal glass product is sought, the heat treatment will be continued for a sufficient length of time to not only promote the precipitation of colloidal silver nuclei, but also to effect the growth of said microcrystals on the silver nuclei to a size large enough to scatter light. The nucleated glass in then cooled — conveniently to room temperature but, in any event, to a temperature at least 25° C. below the strain point of the glass — and again exposed to high energy or actinic radiations. This second exposure intensifies the color, the hue of which was previously determined via the first exposure. Finally, the glass is reheated to a temperature between about the transformation range and the softening point of the glass to produce the desired color in the glass. It has been theorized that submicroscopic particles of metallic silver are precipitated as discrete colloidal particles and/or deposited on the surface and/or within the alkali metal fluoride-silver halide microcrystals.

Although the mechanism of the color phenomenon is not undisputably known, the quantity of silver precipitated and the geometry thereof, as well as, perhaps, the refractive index of the crystals, are deemed to determine the color produced. However, since the colors can be achieved with very low silver contents and exhibit characteristics similar to interference colors, it was surmised that at least one of the three following circumstances is present: (1) discrete colloidal particles of silver less than about 200A in the smallest dimension; (2) metallic silver deposited within alkali fluoride-silver halide microcrystals, the silver-containing portion of the microcrystals being less than about 200A in the smallest dimension; and (3) metallic silver deposited upon the surface of said microcrystals, the silver-coated portion of the microcrystals being less than about 200A in the smallest dimension.

It was then observed that the heat treatment after each exposure to high energy or actinic radiation might consist of a series of heatings and coolings rather than a single treatment as delineated above. Such do not change the color developed but can improve color intensity.

That application also observed that the sequence of colors developed was dependent upon the flux of the initial exposure, i.e., the intensity and/or time of the exposure. Hence, the shortest initial exposure resulted in the development of a green color, followed by blue, violet, red, orange, and yellow as the exposure time and/or intensity was increased.

As has been observed above, the use of consecutive or interrupted heat treatments, either after the initial exposure to high energy or actinic radiation or after the second exposure thereto, can be helpful in intensifying the final color produced. Hence, although the mechanism involved is not fully understood, it appears that two or more treatments at temperatures between the transformation range and the softening point of the glass, separated by a cooling to below the transformation range, provide a more vivid color than a single heat treatment of equal or longer duration.

Furthermore, whereas that application discloses the utility of cooling the heat treated glass only to a temperature at least 25° C. below the transformation range and then exposing it to high energy or actinic radiation, no working example of that embodiment of the invention is supplied. In all of the exemplary illustrations of the inventive processes, the exposures were conducted at ambient temperatures.

SUMMARY OF THE INVENTION

I have discovered a method for making glass articles wherein at least a portion thereof is integrally colored by silver and the colors achieved are of much improved intensity utilizing the basic process set forth in application Ser. No. 646,259, but without requiring consecutive or interrupted heat treatments. The preferred embodiment of the method contemplates exposing the nucleated glass to high energy or actinic radiation while the glass is at an elevated temperature. Thus, the nucleated glass is developed while being exposed at a temperature between about 200°–410° C., preferably about 275°–325° C.

The initial exposure to high energy or actinic radiation, discussed above in the two-exposure process of application Ser. No. 646,259, may also be conducted within the same range of elevated temperatures. This allows the exposure time required to be substantially decreased which reduces the overall time necessary to attain nucleation and incipient crystallization. This feature is advantageous from a commercial point of view. Hence, the total time utilized in exposing the glass to high energy or actinic radiation followed by heat treatment at temperatures between the transformation range and the softening point of the glass to achieve equivalent nuclei and crystallite development is much reduced. However, the effect on the intensity of color displayed by the final product appears to be slight.

Contrariwise, where the nucleated glass is subjected to exposure of high energy or actinic radiation at temperatures between about 200°-410° C., not only is the time required for color development shortened very extensively, but, even more importantly, the colors appear to be purer and more vivid. Thus, the colors developed are certainly equivalent to and, in some instances, appear to be of better quality than those produced through exposure at ambient temperatures followed by several consecutive heat treatments at temperatures between the transformation range of the glass and the softening point thereof.

The range of elevated temperatures to which the glass is subjected during the exposure step must be adhered to closely for the invention to be operable. Hence, at temperatures below about 200° C., the improvement in speed of development and/or in color intensity becomes negligible. At the other extreme, temperatures much in excess of 410° C. lead to the development of a yellow component in any color produced, with the ultimate result that yellow is the only color present.

The preferred process of the invention, then, where two exposures to high energy or actinic radiation are involved, contemplates five general steps:

(1) a batch for a glass having a composition coming within the parameters of application Ser. No. 646,259 is melted and the melt formed into a glass article of a desired configuration;

(2) at least a portion said glass article is exposed to high energy or actinic radiation while at least said portion of said glass article is at a temperature between about 200° -410° C. for a sufficient length of time to develop a latent image therein;

(3) the source of high energy or actinic radiation is removed and the said glass article heated to a temperature between the transformation range and softening point of the glass for a period of time sufficient to cause nucleation and growth of microcrystals of alkali fluoride containing at least one silver halide selected from the group of AgCl, AgBr, and AgI;

(4) at least said previously-exposed portion of said article is re-exposed to high energy or actinic radiation while at least said portion is at a temperature of about 200°-410° C. for a sufficient length of time to cause metallic silver to be deposited as discrete colloidal particles less than about 200A in the smallest dimension, and/or deposited on the surface of said microcrystals, the portion of the microcrystal coated with silver being less than about 200A in the smallest dimension, and/or deposited within said microcrystals, the silver-containing part of the microcrystal being less than 200A in the smallest dimension, said microcrystals having a concentration of at least 0.005% by volume; and then (5) the article is cooled to room temperature.

As was noted above, the initial exposure to high energy or actinic radiation may be conducted at temperatures between about 200°-410° C. However, that practice is optional only since it does not appear to substantively improve the final coloration of the glass, although the step can be advantageous in reducing the time required for nucleation and incipient crystallization. Moreover, if the initial exposure of the glass at elevated temperatures is prolonged for an extended period of time, the glass will simply take on a yellowish cast, if transparent, or assume a white or yellow opaque appearance, if an opal product is formed. Thus, the "conventional" practice of exposure at ambient temperature followed by heat treatment is to be preferred.

The range of temperatures 200°-410° C. is considerably below the strain point or the transformation range of the glasses operable in the present invention. Thus, the strain points of the glasses form a minimum at about 425° C. and the transformation range of the glass is customarily deemed to comprise the temperature at which a liquid melt is converted into an amorphous solid, that temperature being considered to lie in the vicinity of the glass annealing point.

Therefore, the deposition of metallic silver at such low temperatures is not understood since, where the exposure is conducted at ambient temperature, the subsequent heat treatment must be undertaken at temperatures in excess of the transformation range of the glass, i.e., at high enough temperatures to yield a sufficiently low viscosity in the glass to permit such deposition. It is theorized that some interaction occurs between the high energy or actinic radiation and the glass components and/or the microcrystals which "catalyzes" this deposition, permitting its occurrence at lower temperatures with consequent higher glass viscosities.

Although the reaction mechanism requiring two separate exposures is not fully understood, it is believed that the second exposure leads to the development of metallic silver which is the colored species itself, or which is deposited on or within the complex silver-containing, alkali halide crystals. Apparently without an interruption in the exposure, this secondary development of metallic silver does not occur, and the original colloidal silver nuclei and silver-containing alkali halide crystals merely grown to a larger size.

As has been observed above, the present invention is operable with the glasses set out in application Ser. No. 646,259. As reported therein, the glasses generally consist essentially, in weight percent on the oxide basis, of about 10–20% $Na_2O$, 0.0005—0.3% Ag, 1–4% F, an amount of at least one halide selected from the group consisting of Cl, Br, and I at least sufficient to react stoichiometrically with the Ag, but not more than a total of about 4%, and the remainder $SiO_2$. Where ultraviolet radiation having wavelengths between about 2800A–3500A comprises the actinic radiation, about 0.01–0.2% $CeO_2$ will be included in the composition. Finally, where $Sb_2O_3$ and/or SnO are utilized as thermoreducing agents, about 0.1–1% $Sb_2O_3$ and/or about 0.01–1% SnO will be included, the total $Sb_2O_3$ + SnO not exceeding about 1%.

Likewise with respect to application Ser. No. 646,259, in the colored transparent glasses the concentration of the microcrystals will not exceed about 0.1% by volume and the size thereof will not exceed about 0.1 micron in diameter. Normally, to achieve transparent articles, the silver content will be maintained below about 0.1% by weight, the fluoride content will not exceed about 3% by weight, and the total of the remaining halides will be maintained below about 2% by weight. The addition of up to 18% by weight ZnO and up to 10% by weight $Al_2O_3$ can be very helpful in improving chemical durability, melting and forming behavior, and other physical properties of the base glass. Such constitute the preferred glass compositions of the invention.

DESCRIPTION OF PREFERRED EMBODIMENTS

Table I records compositions, expressed in parts by weight on the oxide basis as calculated from the batch, of glasses which are operable in the present invention.

Inasmuch as it is not known with which cation(s) the halides are combined, they are merely tabulated as halide, in accordance with customary glass analysis practice. Also, since the silver content is very low, it is simply reported as Ag. Because the total of the individual constituents closely approximates 100, for practical purposes each may be considered to be present in weight percent.

The actual batch ingredients can comprise any material, either the oxide or other compound, which, when melted with the total batch, will be converted into the desired oxide in the proper proportions. The halides are commonly added as alkali metal halides. Where $Sn^{+2}$ is employed as the thermoreducing agent, it is frequently included in the batch in the form of a halide.

During the melting step, up to as much as 50% by weight of the halide components and up to as much as 30% by weight Ag may be lost through volatilization. However, the addition of extra quantities of those constituents to compensate for such losses is well within the technical ingenuity of the glass technologist.

Whereas the following exemplary compositions primarily involved laboratory scale melting experiments, it will be recognized that large-scale commerical melts requiring pots or continuous glass melting tanks can be conducted with compositions of the subject invention. The batches recited below were compounded, the ingredients ballmilled together to aid in securing a homogeneous melt, and then melted in an electrically-fired furnace operating at about 1450° C. for about 4 to 6 hours with stirring. Glass blocks of various sizes and configurations were cast, ware was blown, sheet 0.125 inches thick was rolled on preheated graphite slabs, and 10 inches diameter dinner plates were pressed. The glass articles were placed in annealers operating at about 375°–450° C.

TABLE I

|  | 1 | 2 | 3 | 4 |
|---|---|---|---|---|
| $SiO_2$ | 72.0 | 72.0 | 72.0 | 72.0 |
| $Na_2O$ | 16.2 | 16.2 | 16.2 | 16.2 |
| ZnO | 5.0 | 5.0 | 5.0 | 5.0 |
| $Al_2O_3$ | 6.9 | 6.9 | 6.8 | 6.8 |
| F | 2.5 | 2.5 | 2.8 | 2.8 |
| $CeO_2$ | 0.025 | 0.05 | 0.1 | 0.1 |
| Br | 1.1 | 1.1 | 0.4 | 0.4 |
| $Sb_2O_3$ | 0.5 | 0.2 | 0.3 | 0.5 |
| Ag | 0.005 | 0.01 | 0.03 | 0.3 |
| SnO | 0.04 | 0.05 | 0.09 | 0.12 |

In the following group of illustrative examples, a 2500 watt mercury vapor lamp system having substantial intensity at a wave length of about 3000A supplied a source of ultraviolet radiation. Other sources of ultraviolet radiation can obviously be employed and, as has been discussed above, high energy electrons and X-radiations can also be utilized to obtain the necessary photoreduction of silver ions.

EXAMPLE I

A pressed disc about 3 inches in diameter and 0.125 inches thick having composition 2 from the above table was ground and polished. Strips of masking tape opaque to ultra-violet radiations were placed on sections of the disc running in the same direction. The strips were so positioned as to divide the top surface area of the disc into nine approximately equal longitudinal portions.

The disc was then exposed at ambient temperature to the ultra-violet lamp in the focal plane of the system. The tapes were successively removed to yield horizontal areas of glass exposed for periods of 5, 10, 20, 25, 35, 50, 65, 95, and 155 seconds, respectively.

Subsequently, the disc was transferred to an electrically-fired furnace and heated at about 450° C./hour to 520° C. and maintained at that temperature for one hour.

The disc was then removed from the furnace and placed upon an electrically-heated laboratory hot plate operating at 300° C. The hot plate with the disc was then positioned under the ultra-violet lamp so that the disc was in the focal plane of the system. After an exposure of 0.5 hour, the ultra-violet light was extinguished and the disc removed from the hot plate.

The strip portions of the disc evidenced the following colors, based upon the length of the initial exposure to ultra-violet light:

5 seconds — light green
10 seconds — green
20 seconds — blue-green
25 seconds — blue
35 seconds — violet
50 seconds — red-violet
65 seconds — red
95 seconds — orange
155 seconds — yellow

EXAMPLE II

This example illustrates the effect which conducting the initial exposure to actinic radiation at elevated temperatures (200°–410° C.) can have upon the rate at which color is developed and the hue thereof.

Two groups of square samples of composition 2 from the above table having a side measurement of about 1 inch were cut from glass sheet of about 0.125 inches thickness, and portions thereof masked. The squares of the first group were placed on the above-mentioned hot plate operating at 250° C. and the hot plate positioned under the ultra-violet lamp such that the samples were in the focal plane of the system. The masks were successively removed from the squares to yield areas of glass exposed for periods of 5, 10, 15, 20, 25, 30, 35, 45, 55, 65, 80, 95, 110, 140, 170, and 230 seconds, respectively. The samples of the second group were positioned in the focal plane of the system and exposed for equal periods of time to ultra-violet radiation at ambient temperature.

The samples from each group were immediately transferred to the above-described electrically fired furnace and heated therein at about 450° C./hour to 520° C. After a heat treatment of 0.5 hour, all the samples were placed on the hot plate operating at 300° C. and the hot plate again positioned properly in the focal plane of the system. After an exposure to ultra-violet radiation for 1.0 hour, the lamp was extinguished and the squares removed into the ambient environment.

The colors developed, reported in terms of the initial exposure to ultra-violet radiation, are set out below:

|  | Group 1 | Group 2 |
|---|---|---|
| 5 seconds | blue-green | pale green |
| 10 seconds | red-violet | green |
| 15 seconds | red-orange | blue-green |
| 20 seconds | orange | dark blue |
| 25 seconds | orange-yellow | violet |
| 30 seconds | yellow | red-violet |
| 35 seconds | yellow | red-orange |
| 45 seconds | yellow | orange |
| 55 seconds | yellow | orange |
| 65 seconds | yellow | orange-yellow |
| 80 seconds | yellow | yellow |
| 95 seconds | yellow | yellow |

-continued

|  | Group 1 | Group 2 |
| --- | --- | --- |
| 110 seconds | yellow | yellow |
| 140 seconds | yellow | yellow |
| 170 seconds | yellow | yellow |
| 230 seconds | yellow | yellow |

Several features are illustrated by the above comparison. Hence, whereas the same sequence of colors is produced in the two groups, the use of elevated temperatures during the initial exposure reduces the time required by about a factor of three. For example, the Group 1 sample displayed a blue-green color after only 5 seconds' exposure, whereas the same shade required 15 seconds at ambient temperature. Likewise, the glass of Group 1 exhibited a red-violet color after 10 seconds' exposure, in contrast to 30 seconds for the glass of Group 2. Both groups of same illustrate that yellow is the last color developed in the sequence and that extended exposures do not alter that circumstance.

EXAMPLE III

A pressed disc about 3" in diameter and 0.125" thick having composition 2 from the above table was ground and polished, and strips of masking tape applied thereto in like manner to that set out above in Example I. The disc was then positioned in the focal plane of the above-described ultra-violet lamp system and exposed for periods of 5, 10, 20, 25, 35, 50, 65, 95, and 155 seconds, respectively.

Thereafter, the disc was transferred to the above-noted electrically-fired furnace and heated at about 450° C./hour to 520° C. After 1 hour, the disc was placed upon the laboratory hot plate operating at 420° C. which was then placed under the ultra-violet lamp such that the disc was in the focal plane of the system. After 0.5 hour, the ultra-violet lamp was extinguished and the disc withdrawn into the ambient environment.

Examination of the disc disclosed very little color except various shades of yellow. This circumstance led to the determination of 410° C. as a practical upper temperature limitation for the process.

EXAMPLE IV

A pressed disc about 3 inches in diameter and 0.125 inches thick having composition 1 recited in the above table was ground and polished, and strips of masking tape applied thereto in accordance with the description of Example I. Subsequently, the disc was exposed to ultra-violet light for the periods of time reported above in Example III. Thereafter, the disc was heat treated for 1 hour at 520° C., also in like manner to Example III, and then placed upon the laboratory hot plate operating at 175° C. The hot plate was positioned under the ultra-violet lamp to place the disc in the focal plane of the system and exposed for 1 hour.

Substantially no truly-definable color was observed in the disc, indicating the temperature was too low to cause the precipitation of metallic silver to produce the desired coloration. In view of that experience, 200° C. has been determined to constitute a practical minimum heat treating-exposure temperature.

I claim:

1. A method for making a glass article wherein at least a portion thereof is integrally colored by silver which consists of the steps:
   (a) melting a batch for a glass containing the constituents of alkali fluoride and the constituents of at least one silver halide selected from the group consisting of silver chloride, silver bromide, and silver iodide;
   (b) forming said melt into a glass article;
   (c) exposing at least a portion of said article at ambient temperature to high energy or actinic radiation;
   (d) heating at least said exposed portion of said article to a temperature between about the transformation range of the glass and the softening point thereof for a sufficient length of time to cause nucleation and growth of microcrystals of alkali fluoride containing at least one silver halide selected from the group consisting of silver chloride, silver bromide, and silver iodide;
   (e) re-exposing at least said portion of said glass article to high energy or actinic radiation while at least said portion is at a temperature below the transformation range of the glass that is at a temperature between about 200°–410° C. for a sufficient length of time to cause metallic silver to be deposited as discrete colloidal particles less than 200A in the smallest dimension, and/or deposited within said microcrystals, the silver-containing part of the microcrystal being less than about 200A in the smallest dimension, and/or deposited on the surface of said microcrystals, the portion of the microcrystal coated with silver being less than about 200A in the smallest dimension, said microcrystals having a concentration of at least 0.005% by volume; and then
   (f) cooling said article to ambient temperature.

2. A method according to claim 1 wherein said re-exposing is conducted at about 275°–325° C.

3. A method of according to claim 1 wherein said glass consists essentially, in weight percent on the oxide basis as calculated from the batch, of about 10–20% $Na_2O$, 0.0005–0.3% Ag, 1–4% F, an amount of at least one halide selected from the group consisting of Cl, Br, and I at least sufficient to react stoichiometrically with the Ag, but not more than a total of about 3%, and the remainder $SiO_2$.

4. A method according to claim 3 wherein said glass also contains about 0.01–0.2% $CeO_2$.

5. A method according to claim 3 wherein said glass also contains up to 18% ZnO and/or up to 10% $Al_2O_3$.

6. A method according to claim 1 wherein said integrally colored portion of said glass article exhibits transparency and the concentration of said microcrystals does not exceed about 0.1% by volume and the size thereof does not exceed about 0.1 micron in diameter.

7. A method according to claim 1 wherein said integrally colored portion of said glass article is polychromatic.

8. A method for making a glass article wherein at least a portion thereof is integrally colored by silver which consists of the steps:
   (a) melting a batch for a glass containing the constituents of alkali fluoride and the constituents of at least one silver halide selected from the group consisting of silver chloride, silver bromide, and silver iodide;
   (b) forming said melt into a glass article;
   (c) exposing at least a portion of said article to high energy or actinic radiation while at least said portion is at a temperature below the transformation range of the glass that is at a temperature between about 200°-410° C. for a sufficient length of time to develop a latent image therein.

(d) removing the high energy or actinic radiation and subjecting at least said portion of said article to a temperature between the transformation range and the softening point of the glass for a period of time sufficient to cause nucleation and growth of microcrystals of alkali fluoride containing at least one silver halide selected from the group consisting of silver chloride, silver bromide, and silver iodide;

(e) re-exposing at least said portion of said article to high energy or actinic radiation while at least said portion is at a temperature below the transformation range of the glass that is at a temperature between about 200°-410° C. for a sufficient length of time to cause metallic silver to be deposited as discrete colloidal particles less than 200A in the smallest dimension, and/or deposited within said microcrystals, the silver-containing part of the microcrystal being less than about 200A in the smallest dimension, and/or depositied on the surface of said microcrystal, the portion of the microcrystal coated with silver being less than about 200A in the smallest dimension, said microcrystals having a concentration of at least 0.005% by volume; and then (f) cooling said article to ambient temperature.

9. A method according to claim 8 wherein said exposing and re-exposing are conducted at about 275°-325° C.

10. A method according to claim 8 wherein said glass consists essentially, in weight percent on the oxide basis as calculated from the batch, of about 10-20% $Na_2O$, 0.0005-0.3% Ag, 1-4% F, an amount of at least one halide selected from the group consisting of Cl, Br, and I at least sufficient to react stoichiometrically with the Ag, but not more than a total of about 3%, and the remainder $SiO_2$.

11. A method according to claim 10 wherein said glass also contains about 0.01-0.2% $CeO_2$.

12. A method according to claim 10 wherein said glass also contains up to 18% ZnO and/or up to 10% $Al_2O_3$.

13. A method according to claim 8 wherein said integrally colored portion of said glass article exhibits transparency and the concentration of said microcrystals does not exceed about 0.1% by volume and the size thereof does not exceed about 0.1 micron in diameter.

14. A method according to claim 8 wherein said integrally colored portion of said glass article is polychromatic.

* * * * *

UNITED STATES PATENT OFFICE
CERTIFICATE OF CORRECTION

PATENT NO. : 4,092,139
DATED : May 30, 1978
INVENTOR(S) : Joseph Ference

It is certified that error appears in the above-identified patent and that said Letters Patent are hereby corrected as shown below:

Column 7, line 18, "same" should be -- samples --.

Signed and Sealed this

Sixth Day of March 1979

[SEAL]

Attest:

RUTH C. MASON
Attesting Officer

DONALD W. BANNER
Commissioner of Patents and Trademarks